(12) United States Patent
Don et al.

(10) Patent No.: US 8,706,624 B2
(45) Date of Patent: *Apr. 22, 2014

(54) METHODS, SYSTEM AND ASSOCIATED COMPUTER EXECUTABLE CODE FOR FACILITATING CREDIT TRANSACTIONS

(71) Applicant: Pay It Simple Ltd., Jerusalem (IL)

(72) Inventors: Gil Don, Tel Aviv (IL); Alon Feit, Tel Aviv (IL); Victoria Niel Kraine, Herzelia Pituah (IL)

(73) Assignee: Pay It Simple Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,876

(22) Filed: Oct. 4, 2012

(65) Prior Publication Data

US 2013/0173448 A1  Jul. 4, 2013

Related U.S. Application Data

(63) Continuation-in-part of application No. 12/344,371, filed on Dec. 26, 2008, now Pat. No. 8,290,864.

(60) Provisional application No. 61/016,818, filed on Dec. 27, 2007.

(51) Int. Cl.
    *G06Q 40/00* (2012.01)

(52) U.S. Cl.
    USPC .................................. 705/40; 706/38; 706/39

(58) Field of Classification Search
    USPC ..................... 705/35, 38, 39, 40, 14
    See application file for complete search history.

(56) References Cited

U.S. PATENT DOCUMENTS

2006/0247975 A1* 11/2006 Shapiro et al. .................. 705/14

* cited by examiner

*Primary Examiner* — Ojo O Oyebisi
(74) *Attorney, Agent, or Firm* — Vladimir Sherman; Professional Patent Solutions

(57) ABSTRACT

Disclosed is a system and method for Facilitating Credit Transactions, which may allow for the division of a given purchase or cash-withdrawal transaction amount, into periodical installments by enabling the financing of said transaction.

35 Claims, 12 Drawing Sheets

FIG. 3

| Sub Total: | 2663.99 |
|---|---|
| Installments | |
| # of Installments: | 10 |
| Interest: | 207.14 |
| Total: | 2871.13 |

| First Installment: | 287.13 |
|---|---|
| Balance Due: | 2584.00 |

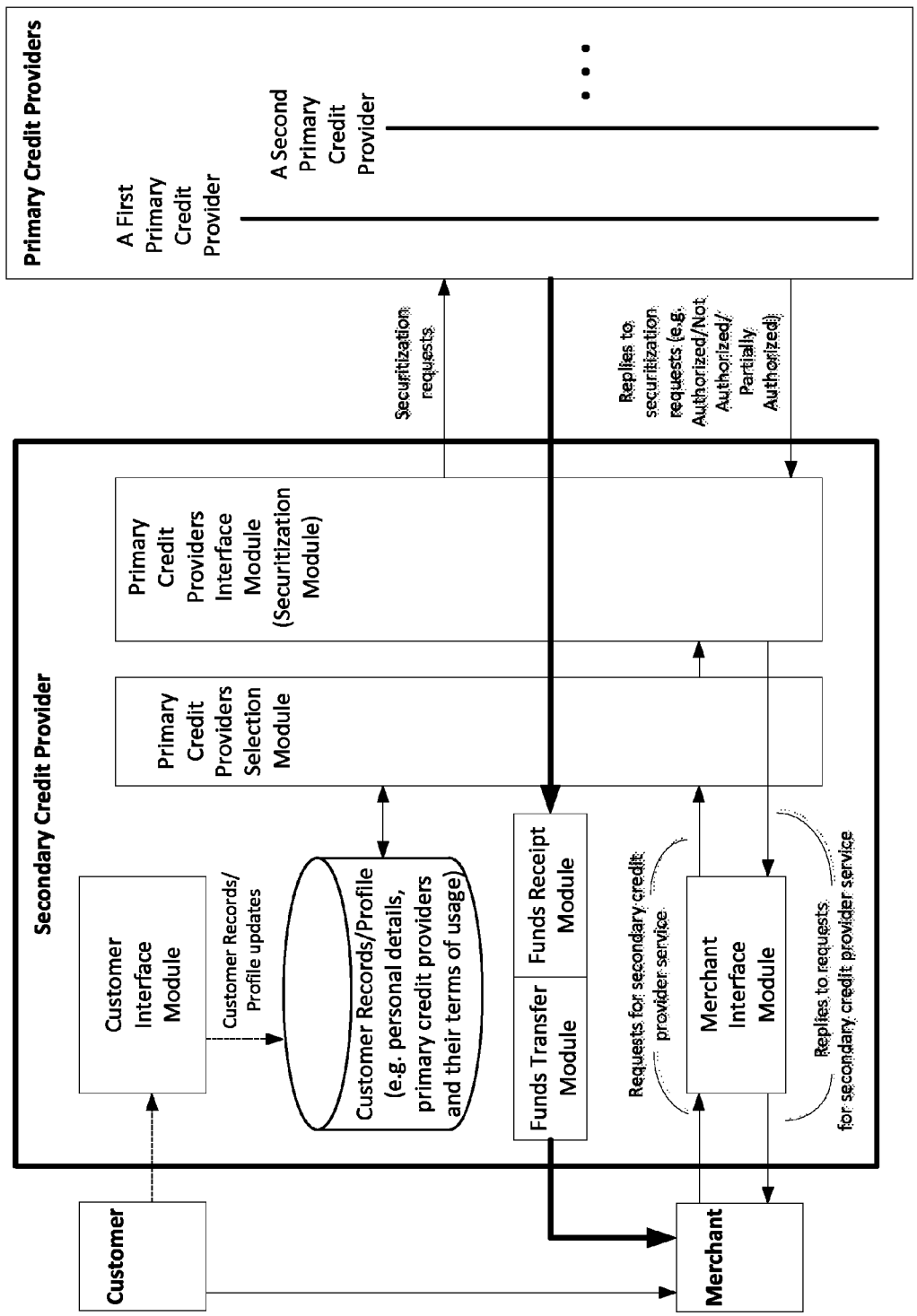
Fig. 4 – Secondary credit provider modules and interactions

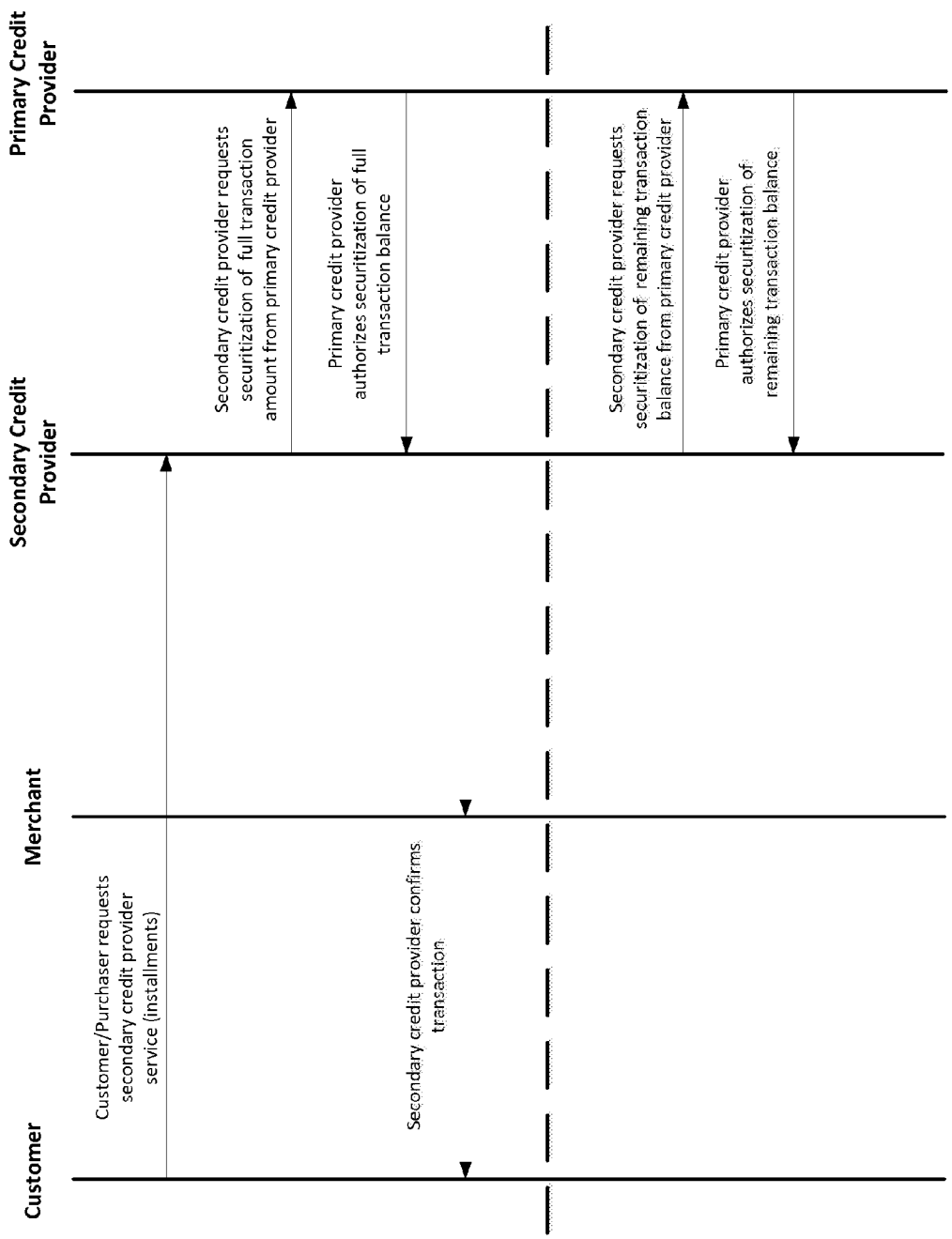
Fig. 5 – 2 Stages authorized

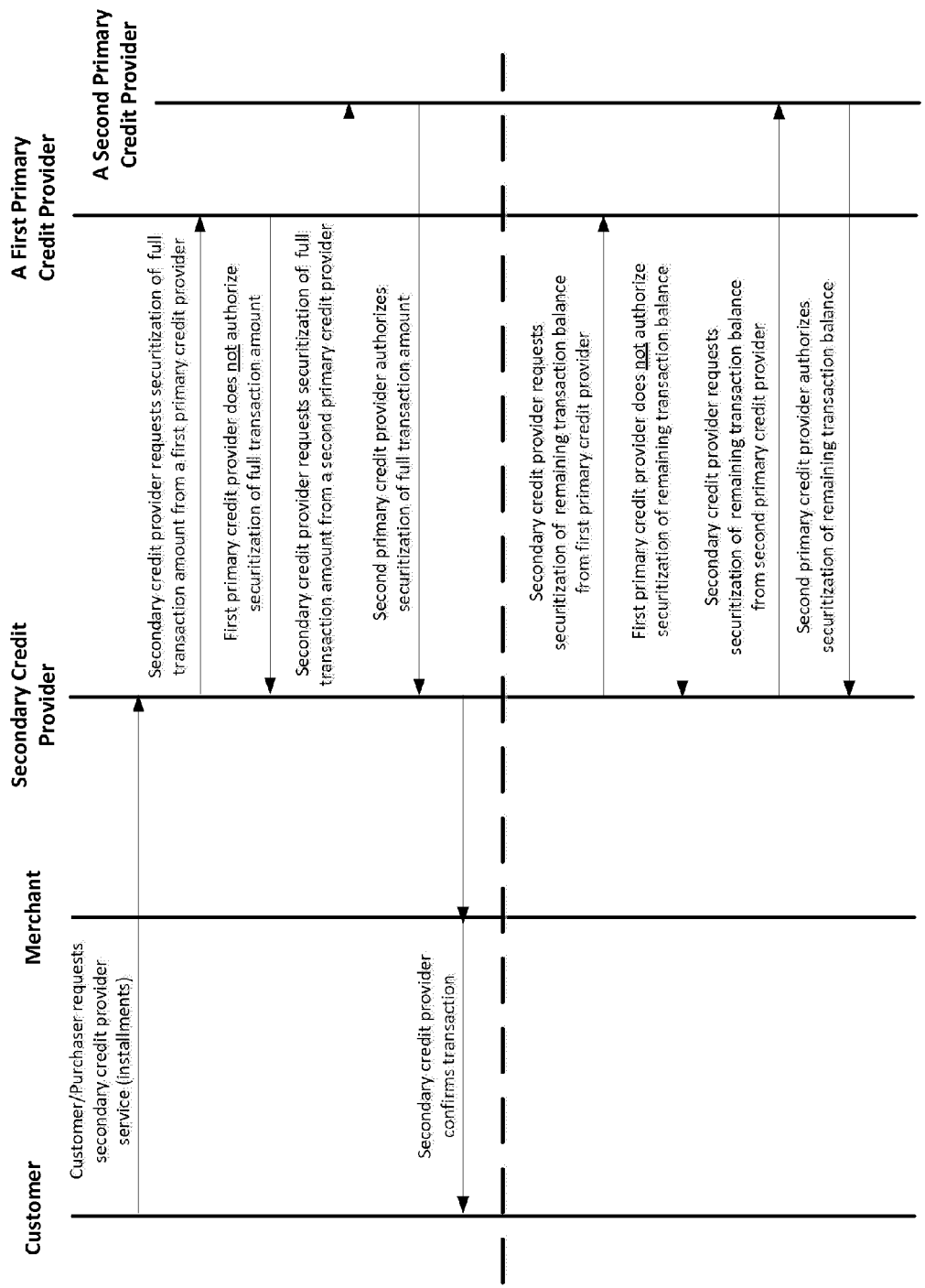
Fig. 6 – 2 Stages not authorized

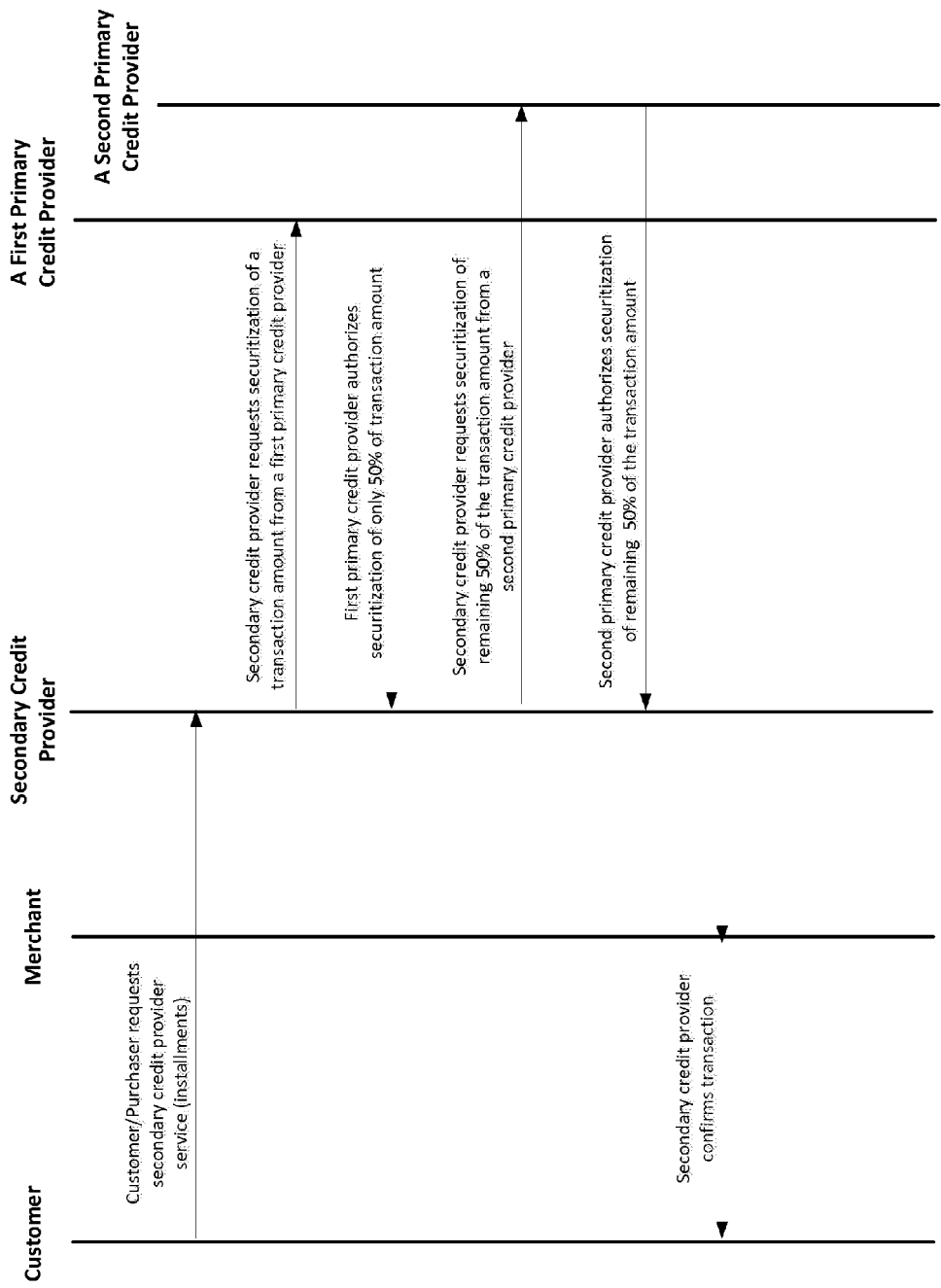
Fig. 7 – partial authorization

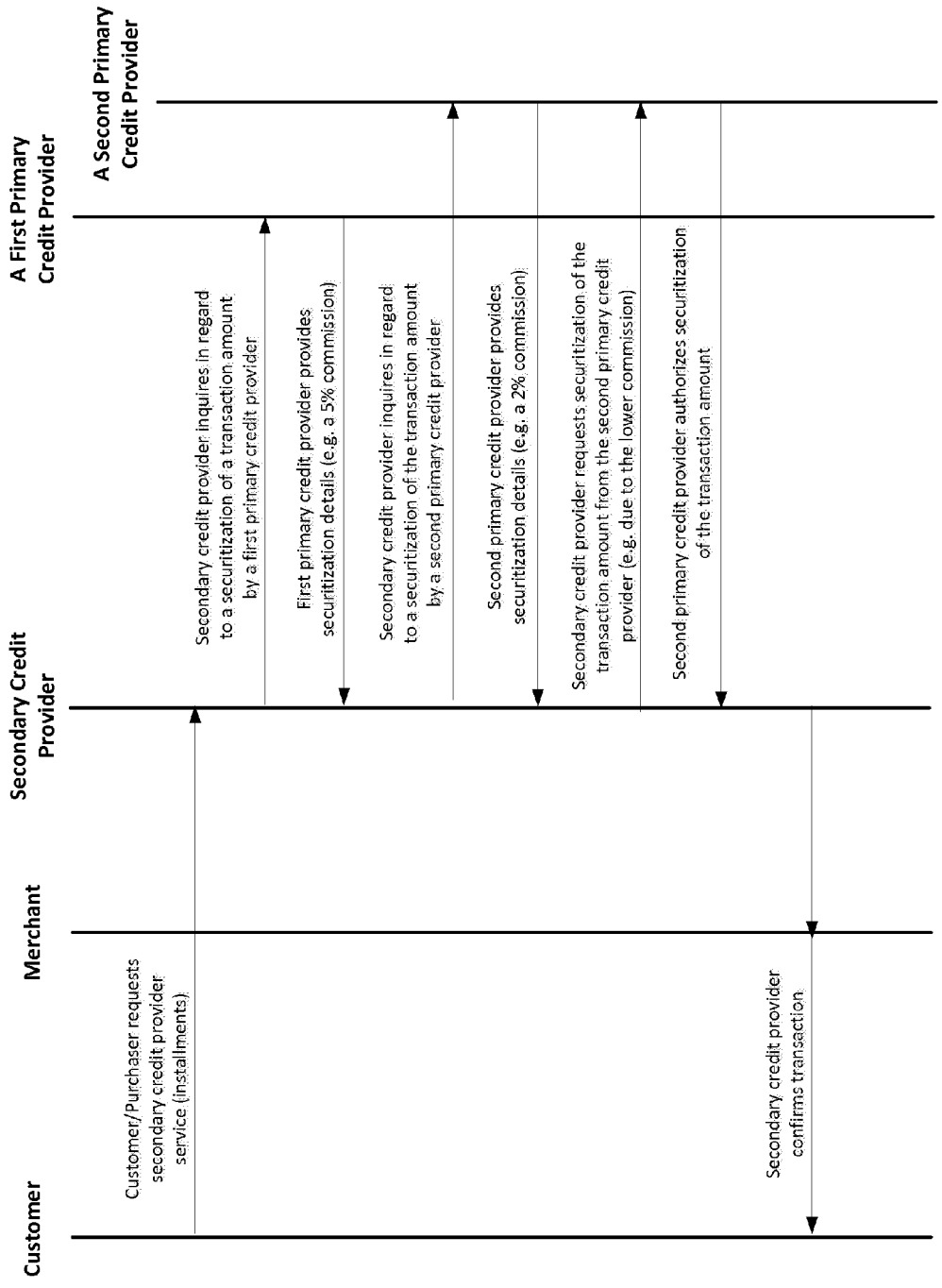
Fig. 8 – preferable authorization

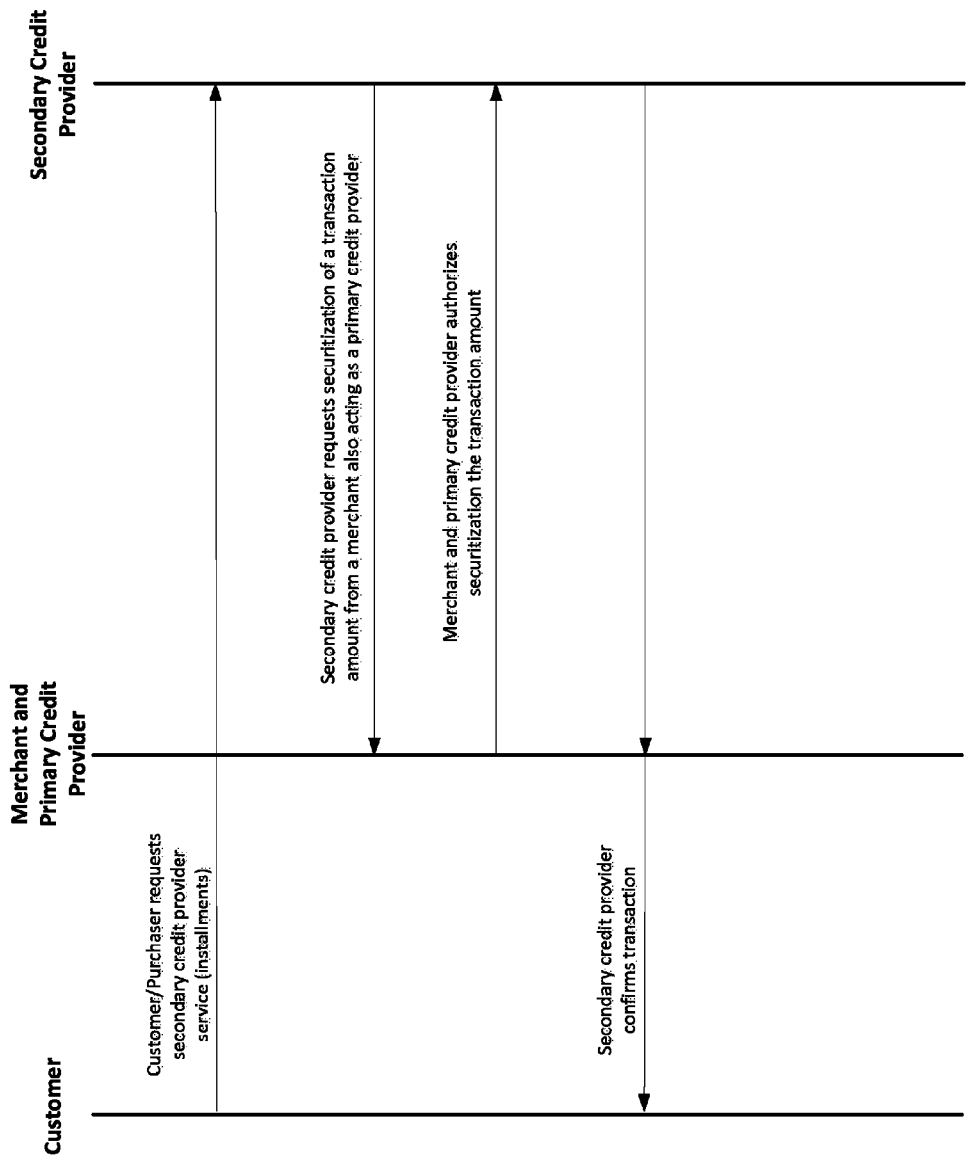
Fig. 9 – Merchant authorization

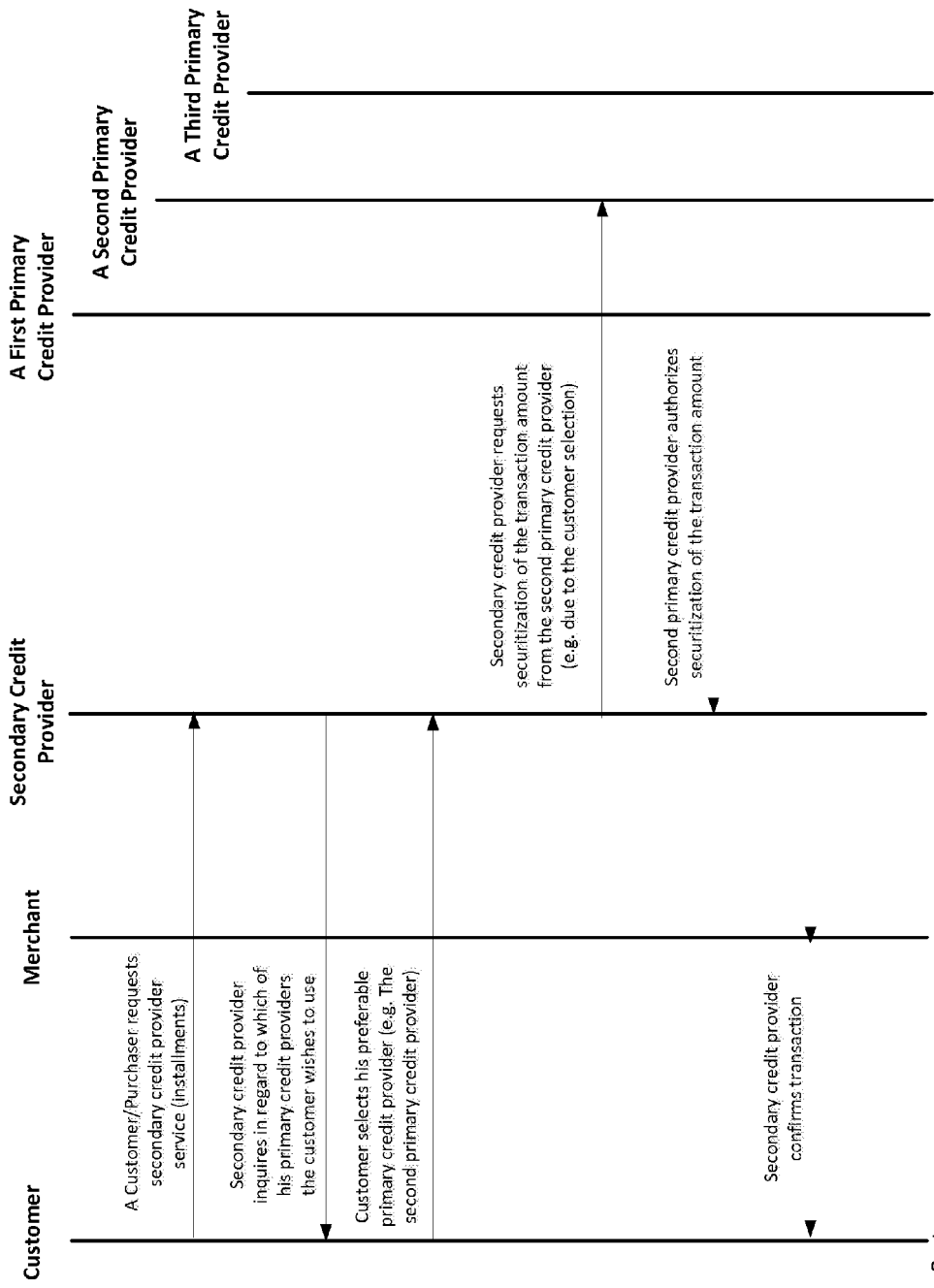

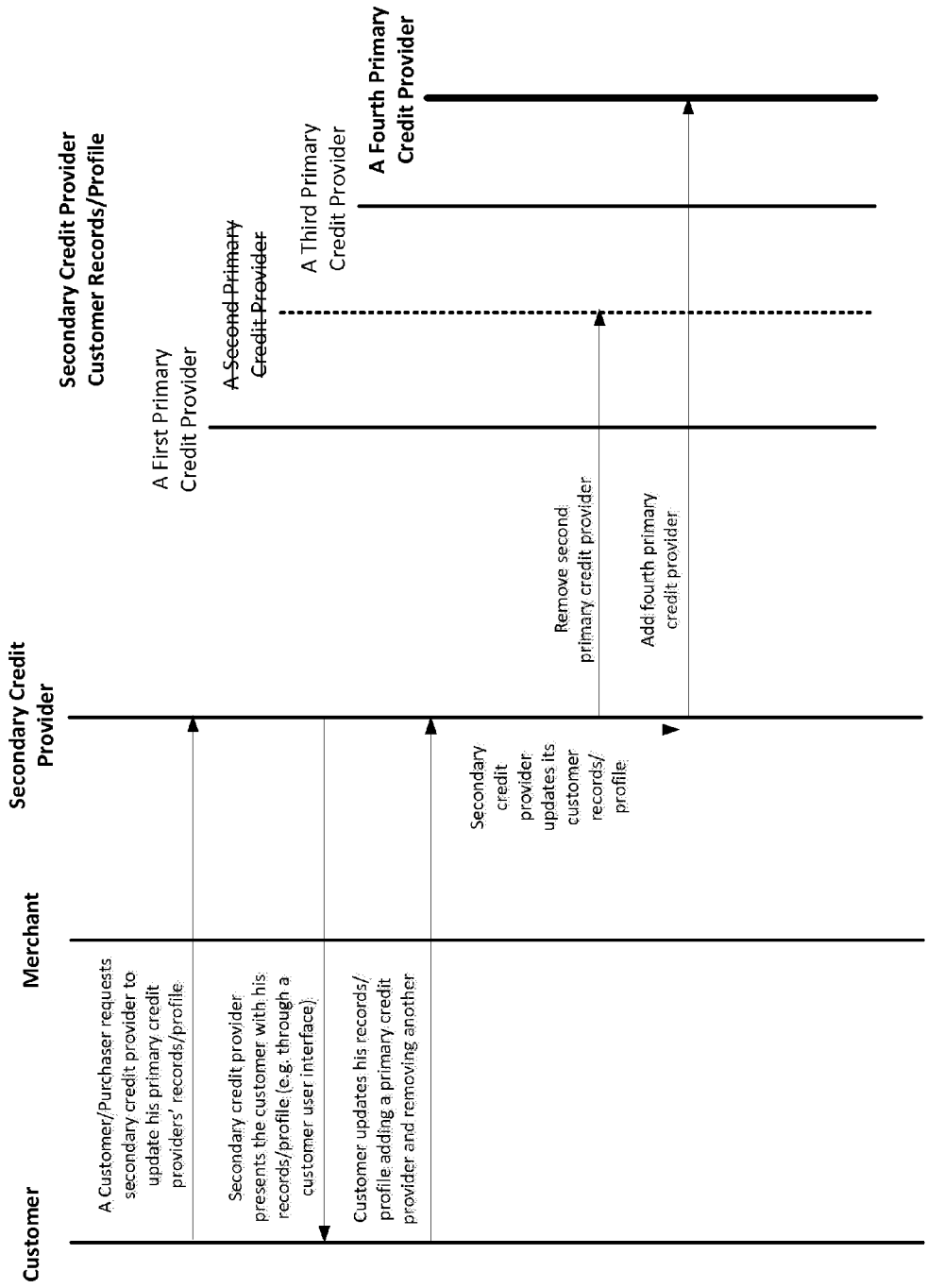
Fig. 11 – Customer updates his primary credit providers list

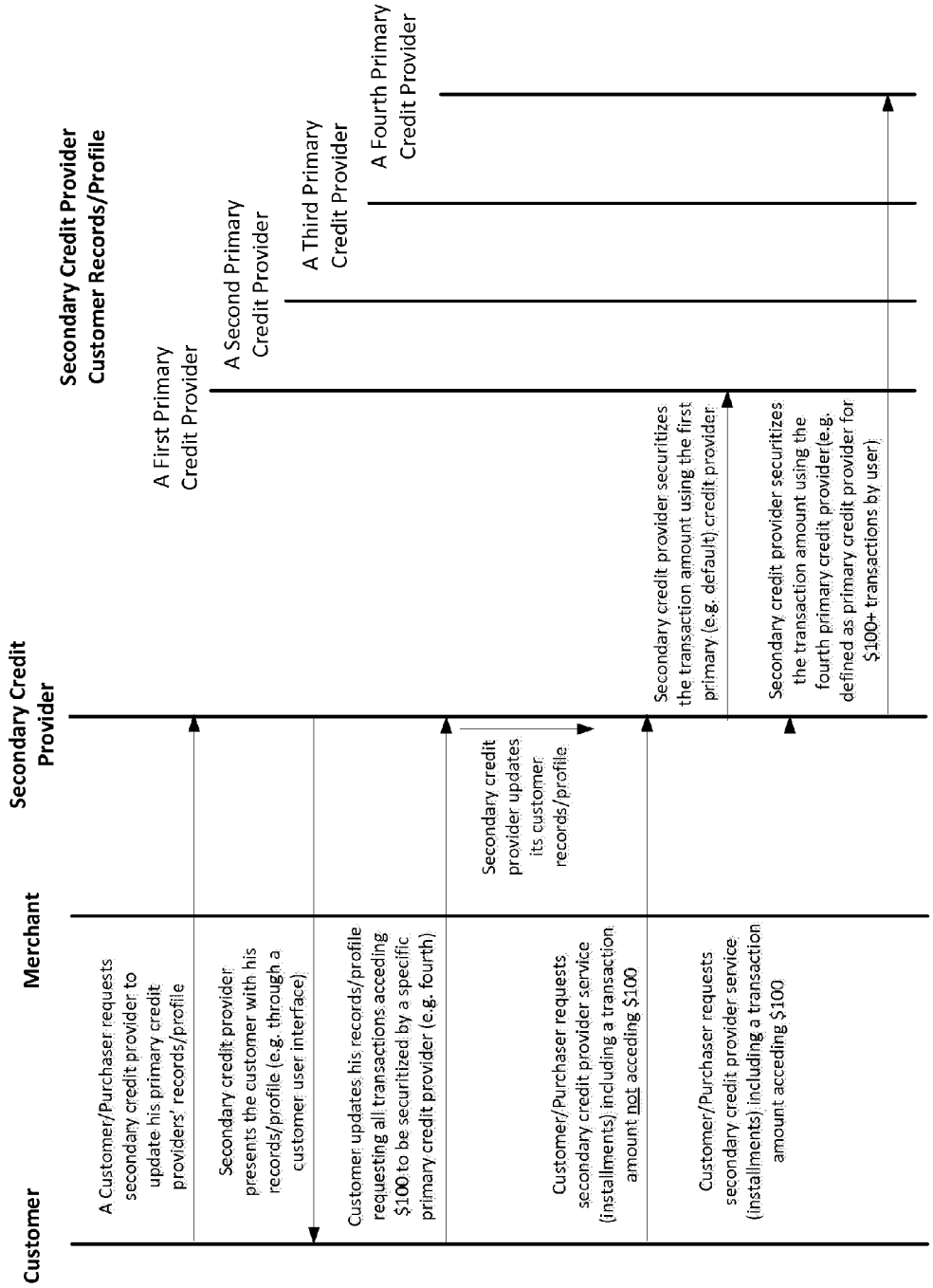
Fig. 12 – Customer defines his primary credit providers' terms of usage

METHODS, SYSTEM AND ASSOCIATED COMPUTER EXECUTABLE CODE FOR FACILITATING CREDIT TRANSACTIONS

FIELD OF THE INVENTION

The present invention generally relates to the field of financial credit transactions. More specifically, the present invention relates to a system and method for facilitating financial credit installments.

BACKGROUND OF THE INVENTION

People, inherently, in most of the western civilization, spend a significant portion of their life and money on buying products and services. While fulfilling this purchasing "role", they are identified as Consumers. The common, and logical, perception is that for a consumer to be able to purchase her/his desired goods or services, be it day to day needs, assets, presents, travel, etc., she/he is required to have the available financial means, namely "enough money in the bank", or elsewhere.

Several consumption and purchasing mechanisms have been around, some going back to the dawn of history, allowing consumers to purchase goods and services without necessarily having the required funds at the time of purchase, rather using money they do not own to finance the purchase, and pay back at a later stage.

To name a few current such financing schemes:
Bank loans;
Mortgages;
Leasing (cars, etc.); and
Revolving credit card schemes: allowing consumers to pay their credit card expenses gradually (revolving them).

Obviously these financing methods, and others, do not come free of charge. Consumers are usually charged, on top of the purchase cost, financing fees by the institute or body providing the funds that enable the purchase.

It is quite often that such financing mechanisms are used even by consumers having enough immediate funds, but preferring to not spend them on the current purchase, thus controlling their cash flows, just like any business firm does.

Possible reasons for such behavior may include:
A future expense is expected and will require available funds;
The current purchase, for which a "loan" is taken, is about to exceed the consumer's periodical budget/salary;
Money is invested and cannot be used; and
Emotional/Psychological motivations (e.g.: financial security).

The financing solutions are provided by a variety of sources, some providing a general purpose loan, not linked to a specific purchase, and others link the "loan" to a specific purchase/product/service. For example:
General Purpose Financing:
Credit card issuers (revolving credit accounts, etc.);
Financial institutions: banks, etc. (loans); and
Installment loans.
Specific Financing:
Mortgage banks;
Car/other leasing companies; and
Merchants or service providers.
Revolving Credit Card Loans The revolving instrument is a common worldwide credit card industry solution of general purpose loans. In the revolving method, a card holder can decide how much of his monthly credit card expenses he would rather revolve to the next month (within certain limitations).

The financing costs for such instrument are Annual Percent Rate (APR) derived from the national Federal interest rate. It is not fixed, and usually raises a lot above the Federal interest rate.

One reason for the high revolving APRs is the "risk" institutes (Credit card issuers/banks), providing such loans, take: A card holder can try avoiding some or all future payments, when in fact the product or service is already his/hers, in several ways:
Denying the purchase;
Closing the account; or
"Disappearing".
Such cases "expose" the loaning institute to unplanned cost and thus loss of money.

The revolving mechanism is common in the US consumer credit market, due to the popularity of credit cards as a monetary instrument (over 150 million cards in the year 2006), where more than 60% of card holders are using revolving credit line on their cards.

Once a consumer has been approved for a credit line (usually pre approval), it is easy and immediate to use revolving mechanism for any purpose at any time, using his/her credit card. It is though, carrying one of the most expensive interest rates for consumers.

During 2006 the revolving system in the credit card industry at the US only had an outstanding of approximately US$826.6 Billion, compared to US$ 1,526.4 Billion in non revolving credit system (e.g.—loans) for consumer spending (excluding housing), most of which is not done through credit cards.

Americans are used to using non-revolving credit (mainly leasing or other periodical pay-back loans) for high value items such as cars, mobile homes, education, boats or vacations. These are usually financed by the manufacturers or financial institutions in fix monthly installments.
Leasing Leasing loans are available in the US, but are mostly limited to specific high ticket purchases, such as cars, houses and boats, provided directly by the merchant and dedicated for the desired consumer product i.e. "specific purchase" loan.

In this case, the purchased product is registered as a grantee for the given loan. The APRs for such loans vary between industries and are usually lower than the APR of the revolving credit card APR's. This kind of credit loan is usually not preapproved as in the case of revolving credit card accounts.

SUMMARY OF THE INVENTION

According to some embodiments of the present invention, as part of a transaction between a merchant and a purchaser of goods, or services, or of financial services, or of real estate, of lease services, and/or a leaser of any goods, services and/or real estate etc. (herein after referred to as "Consumer" or "Customer"), the Consumer may request to split a cost or payment required from the Customer in connection with the transaction into a set of partial repayments or installments such that the full transaction cost may be spread across the set of partial repayments, which partial repayments are spread across and made intermittently over some period of time. One or more credit providers may execute/provide full or partial payment for the transaction, to the merchant on behalf of the Consumer, on condition that the Consumer will repay the full transaction amount along with financing charges to the creditor using periodic partial repayments, wherein an outstanding repayment balance may substantially continuously be securitized by an intermittent re-securitization mechanism. According to some embodiments, the one or more credit providers executing a transaction related payment on behalf of the Customer may be secondary credit providers, which secondary credit provider may securitize any outstanding repayment balance against credit provided by a primary credit provider (e.g. Credit Card Issuer, Credit Card Underwriter, Credit Union or Bank, etc.).

An agreed upon schedule for the set of partial repayments amounts across an agreed period of time may be referred to as a repayment schedule and may be pre-defined or pre-determined. According to further embodiments, the repayment schedule (e.g. recurring repayment date, period between partial repayments, repayment amount, etc.) may be selected by the Consumer, for example during the transaction or purchase. According to even further embodiments, the repayment schedule may be altered or restructured (e.g. delayed repayments—extend period between repayments, accelerated repayments—reduce period between repayments, repayment date offset—change date of the month, repayment amount, etc.) after the transaction or purchase date. Re-securitization may be performed automatically in connection with the repayment schedule.

The present invention is a system and method for facilitating a transaction. According to some embodiments of the present invention, as part of a transaction between a merchant and a Consumer/Customer of goods and/or services and/or monetary means (e.g. cash), which may be initiated at or through any point of access (e.g. online, point of sale, mobile point of sale, automatic teller machine; and/or any communication device, such as a mobile phone, or attachment thereof, and or any other point of access known today or to be devised in the future), the Consumer may request to split the transaction cost into a set of payments/installments, by which costs may be spread over a period of time. Said set of payments and said period of time may be pre-defined or pre-determined.

According to some embodiments of the present invention, as part of a cost spread to installments, a Consumer of goods and/or services and/or monetary means (e.g. cash), may request that a secondary credit provider pay the merchant the cost of the purchased goods and/or services. Said secondary credit provider may be any third party willing to finance said transaction (e.g. any financial institution, the merchant himself). According to further embodiments, there may be a party which organizes payment by installments and the operation of the transaction system described hereinafter (e.g. an independent third party, a merchant, a secondary credit provider, a primary credit provider).

According to some embodiments of the present invention, the secondary credit provider may provide the Consumer with repayment terms (e.g. monthly payments/installments) for the principle amount to be paid by the secondary provider and/or for financing fees (e.g. interest or any other kind of fees). The secondary credit provider may securitize the amounts to be paid to the merchant with a credit line provided to the Consumer by a primary credit provider (e.g. credit card company). Concurrent with or prior to payment to merchant, the financing party (e.g. secondary credit provider) may request from the primary credit provider credit authorization for the remaining amounts due, including financing fees (e.g. interest, commission, any other supplementary fee(s) and possible penalties).

According to further embodiments, the following types of monetary costs/fees/transactions may be securitized: actual costs of transactions; financial fees (e.g. as stated above); any additional fees, fines and/or penalties associated with secondary credit; payments for damages caused to goods, real estate and so on; payment of fees, fines and/or penalties associated with the underlying transaction; payment of taxes, insurance(s) and/or any other payment associated with the underlying transaction; payment(s) of fees and penalties associated with the organizing of the secondary credit, with organizing payment by installments, with organizing the use of the transaction system described hereinafter, and so on.

According to yet further embodiments, the various costs, fees, penalties and/or damages may be distributed to partial payments (installments) according to various algorithms, including, but in no way limited to, the following cases: (i) each installment is of an equal amount; (ii) entire amount of several fees, or all fees, are included in the first installment; (iii) distribution of all above mentioned costs by virtually the same algorithm, in a manner substantially similar to the distribution of the interest in many real-estate loans; (iv) the cost, damages, fees and penalties associated with terminating/finishing/ending of the lease becomes a part of additional installment(s); (v) the cost, damages, fees and penalties associated with the premature termination of a transaction is added the current installment or the additional installment(s); (vi) the cost, damages, fees and penalties are added to the securitized amount based on algorithms that take into account probabilities and consumer profile, and other related considerations.

According to some embodiments of the present invention, the secondary credit provider may request from the primary credit provider partial payment of the authorized credit based on the agreed upon repayment terms between the secondary credit provider and the Consumer. Since each credit authorization expires either within a predefined period of time or based on some action, the secondary credit provider may re-securitize any remaining balance owed to it by the Consumer by intermittently re-requesting credit authorization for the remaining balance.

According to some embodiments of the present invention, the above re-securitization and money transfer cycle may be re-executed until all due payments are transferred to the secondary credit provider. In the event of a re-securitization failure, said secondary credit provider may request the primary credit provider to transfer the full remaining balance from the Consumer to it, based on the last prior credit securitization performed.

According to some embodiments of the present invention, there are provided a methods and systems for facilitating credit based transactions associated with purchase of goods, services or real estate having a cost. According to some embodiments of the present invention, data indicating the cost of goods or service may be received over a data network. The cost of the transaction may then be securitized over a data network against a credit line provided by a primary credit provider. Upon securitization, a secondary credit provider may fund the transaction. The secondary credit provider may intermittently receive partial payment of the transaction's cost and while intermittently re-securitizing an outstanding transaction balance.

According to some embodiments of the present invention, a transaction system may comprise of one or more transaction servers including a collective control logic adapted to: (1) receive over a data network the data indicating the cost of goods or service; (2) securitize over a data network the cost of the transaction against a credit line provided by a primary credit provider; (3) fund the transaction upon securitization; (4) intermittently receive partial payment from the primary credit provider; and (5) intermittently re-securitize an outstanding balance.

According to some embodiments, a transaction between a merchant and a Customer may involve the merchant providing to the Customer goods, services, real estate, leasing services, financial services and/or any combination thereof. The transaction may be a conventional merchant transaction, an online transaction, a mobile transaction and/or any other type of transaction known today to be devised in the future.

According to some embodiments, the merchant may be a retailer of goods and/or a provider of services such as: (1) financial services, (2) banking services, (3) leasing services, (4) communication services, (5) medical services, (6) travel services, (7) currency exchange service, or any other goods or services. The merchant may provide Customer with goods, services, cash or real estate: (1) at a manned point of sale (e.g. cash register), (2) through an automated apparatus (e.g. product dispenser, automatic teller machine, etc.), (3) through an online e-commerce site or through an online checkout application, and/or (4) via a mobile commerce system.

According to some embodiments a Customer may establish facilities or availability for transaction payment by the secondary creditor (secondary credit provider) either during or in advance of a given transaction. As part of establishing a Payer arrangement with a secondary creditor, the Customer may provide personal and financial information including: (1) name, (2) address, (3) an identifications number (e.g. Social Security Number), and (4) one or more identifiers of primary creditor accounts (e.g. credit card accounts) against which the secondary creditor may secure repayment of payments made or other consideration extended by secondary creditor on behalf of the Customer.

According to some embodiments of the present invention, as part of a transaction cost/amount being spread to installments, a Consumer of goods and/or services and/or monetary means (e.g. cash), may utilize a payment mechanism or token, such as a payment card or online payment application, provided by a secondary credit provider. Using the secondary credit provider's payment mechanism may cause the secondary credit provider to: (1) authenticate details of the transaction; (2) check availability of one or more primary credit-lines sufficient to cover the transaction amount, and (3) subject to (1) and (2), to pay the merchant the some or all of the cost of the purchased goods and/or services. The secondary credit provider may be any third party willing to finance said transaction (e.g. pay the merchant).

According to some embodiments of the present invention, partial payment of the transaction's cost may be received either from the primary credit provider, directly from a purchaser of the goods or service, or from any other individual(s) and/or entity(ies) on behalf of such purchaser. Furthermore, the cost of such a transaction may be received by any of the abovementioned means or a combination thereof. According to some embodiments of the present invention, upon a re-securitizing failure, secondary credit provider may receive full balance payment from the primary credit provider or receive re-securitization from the same primary credit provider or from other credit provider(s) using different account(s) of the Consumer or account(s) of other individual(s) or entities (upon prior or present instruction of consumer and prior or present consent of such individual(s) and entities).

According to further embodiments, partial payment (installments) may be received from the purchaser using direct transfer from the bank account or any other account of the purchaser; by using a check(s), or drafts, drawn against the purchaser's bank account or any other account, possibly as a 'bank check'—a check drawn against assets and/or general credit of the bank; by any debit card; by any credit card; by any financial instrument; by cash; by wire transfer; by token(s); by electronic payment(s) (including over the Internet); by electronic payment of tokens (e.g. 'web money'); and/or by any other method(s) known today or to be devised in the future. Any account, any debit card, any credit card and so on, does not necessary mean a purchaser's account or debit/credit card, but may refer to any account, debit/credit card and the like, of any other individual(s) or entity(ies).

According to further embodiments, revolving credit with securitization may be used for payment of leasing (rent), payment for goods and/or services, or payment for real estate. Furthermore, such methods may be used for securitization of periodic payments (e.g. timed installments such as monthly payments); payments for damages to leased property or any other damages; payment of various fines, fees and penalties related to the credit; payment of various fines, fees and penalties related to the underlying transaction, including various fees, fines, and penalties related to the termination or finishing of the lease; and/or costs of taxes, insurances, communal payments and so on, related to the underlying transaction. According to some embodiments, the revolving credit with securitization may allow the purchaser to avoid: bank guaranties, pre-payment for security deposit, cleaning fee, pre-payment for several rent periods/months, deposit for key, pre-payments for possible damages, and/or pre-payments for insurance, taxes and/or communal payments and any other pre-payment(s).

BRIEF DESCRIPTION OF THE EXEMPLARY FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying exemplary figures in which:

Figure 1:
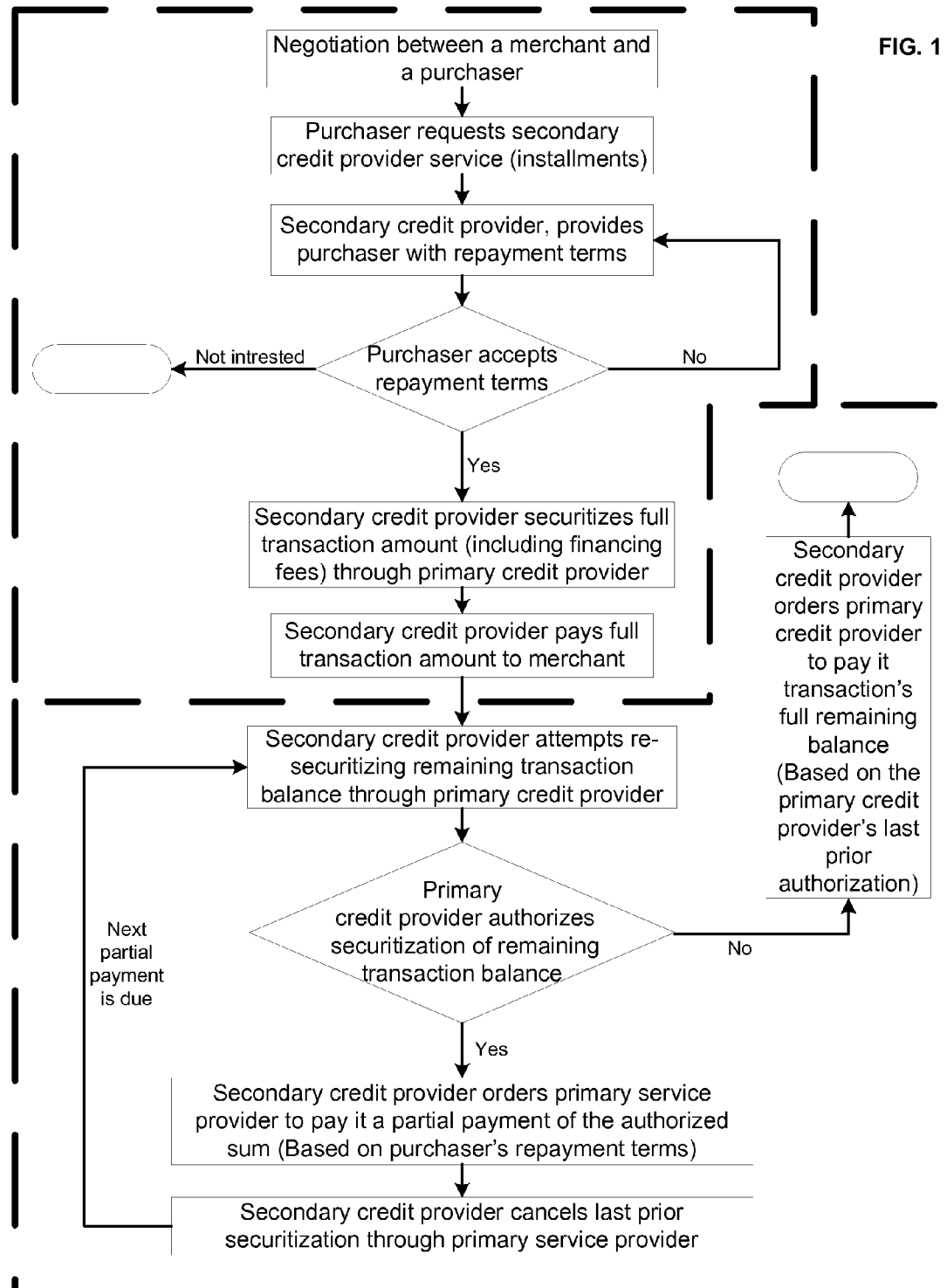
FIG. 1 is a flow chart describing the stages and steps of an exemplary method for facilitating installment transactions, in accordance with some embodiments of the present invention.

FIG. 3 is an image of an exemplary transaction payment arrangement, in accordance with some embodiments of the present invention; and FIG. 4 is a table describing the modules of an exemplary system for facilitating transactions comprising a consumer interface module, a merchant interface module and a primary credit provider(s) interface module, in accordance with some embodiments of the present invention; and FIGS. 5-12 are various exemplary primary credit provider securitization scenarios made by an exemplary system for facilitating transactions, in accordance with some embodiments of the present invention.

DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, or a man operated such system, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

Furthermore, the Primary Credit Provider—may also be regarded as a credit card issuer (backed up by the card holder's credit/bank/other account); the Secondary credit provider—may also be regarded to as the Invention, The invention system or simply as the System. This however, shall not limit the present invention's embodiments, functions or abilities—to those of the Secondary credit provider as described in the present application; the Term Credit securitization—May Comprise of some or all of the following steps, regarded to as Credit request, Credit authorization and Credit clearing that may be accompanied by a corresponding time period and amount; The Consumer—May also be regarded to as Buyer, Consumer, Customer, Credit Card holder or simply as the Card holder; and A partial payment (based on the repayment terms between the secondary credit provider and the Consumer)—may also be regarded to as an Installment.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a system and method for facilitating a transaction. According to some embodiments of the present invention, as part of a transaction between a merchant and a Consumer/Customer of goods and/or services and/or monetary means (e.g. cash), which may be initiated at or through any point of access (e.g. online, point of sale, automatic teller machine), the Consumer may request to split the transaction cost into a set of payments/installments, by which costs may be spread over a period of time. Said set of payments and said period of time may be pre-defined or pre-determined.

[Transaction Types]

According to some embodiments, a transaction between a merchant and a Customer may involve the merchant providing to the Customer goods, services, financial services and/or any combination thereof. The transaction may be a conventional merchant transaction, an online transaction, a mobile transaction and/or any other type of transaction known today to be devised in the future. According to some embodiments, the merchant may provide the Customer with negotiable financial instruments such as a currency of one or more countries, bearer bonds, or the like. All existing or future types of transactions possible between a merchant and a Consumer of goods and/or services may be supported (e.g. online/internet; point of sale; automatic teller machine, etc.) by various embodiments of the present invention.

[System, Interface and Customer Features]

According to some embodiments of the present invention, there are provided a methods and systems for facilitating credit based transactions associated with purchase of goods or service having a cost. According to some embodiments of the present invention, data indicating the cost of goods or service may be received over a data network. The cost of the transaction may then be securitized over a data network against a credit line provided by a primary credit provider. Upon securitization, a secondary credit provider may fund the transaction. The secondary credit provider may intermittently receive partial payment of the transaction's cost and while intermittently re-securitizing an outstanding transaction balance.

According to some embodiments of the present invention, a transaction system may comprise of one or more transaction servers including a collective control logic adapted to: (1) receive over a data network the data indicating the cost of goods or service; (2) securitize over a data network the cost of the transaction against a credit line provided by a primary credit provider; (3) fund the transaction upon securitization; (4) intermittently receive partial payment from the primary credit provider; and (5) intermittently re-securitize an outstanding balance.

In FIG. 1 there is shown, in accordance with some embodiments of the present invention, a flow chart describing the stages and steps of an exemplary method for facilitating installment transactions. The first part of the process begins with a negotiation of the cost of goods or service between a merchant and a purchaser. Once the price has been agreed, the purchaser requests secondary credit provider services (installments), and receives in return, possibly through the merchant or merchant terminal, the repayment terms offered by the secondary credit provider. The purchaser may then: accept the terms, request another repayment offer, or decide he is not interested. The Secondary credit provider then securitizes the full transaction amount (including financing fees) through the primary credit provider and pays the full transaction amount to merchant. In the second part of the process the secondary credit provider attempts re-securitizing the remaining transaction balance through the primary credit provider. If the primary credit provider authorizes the securitization of the remaining transaction balance the secondary credit provider orders the primary service provider to pay it a partial payment of the authorized sum (Based on purchaser's repayment terms) and cancels the last prior securitization made through the primary service provider, this iteration may repeat until the full amount of the transaction is paid to the secondary credit provider. If, on the other hand, the primary credit provider does not authorize the securitization of the remaining transaction balance, the secondary credit provider orders the primary service provider to pay it the transaction's full remaining balance (Based on the primary credit provider's last prior authorization).

According to some embodiments of the present invention, a securitization module may be adapted to receive over a data network the data indicating the cost of goods or service. The data may be received from a merchant agent selected from a group consisting of Terminal Merchant Agent, On-Line Merchant Agent, Check-out Provider Agent and Cash Withdrawal Agent. The securitization module may be further adapted to receive data relating to the number and/or sum(s) of said partial payments. According to some embodiments of the present invention, the securitization module may be adapted to securitize the cost of the transaction against a credit line provided by a primary credit provider, a securitization may comprise of initiating a credit request and receiving a credit authorization.

According to some embodiments of the present invention, a funds transfer module may be adapted to fund of the transaction upon its securitization (e.g. by transfer of funds to merchant of goods/services). According to some embodiments of the present invention, a fund receipt module may be adapted to intermittently receive partial payment or to receive full payment, from the primary credit provider. The fund receipt module may be further adapted to receive full balance payment from the primary credit provider upon a re-securitization failure. According to some embodiments of the present invention, the transfer of funds to the merchant may only be done upon shipping of the goods to the consumer.

According to some embodiments of the present invention, the securitization module may be further adapted to intermittently re-securitize an outstanding balance. A re-securitization may comprise of initiating a credit request and receiving a credit authorization.

Figure 2:
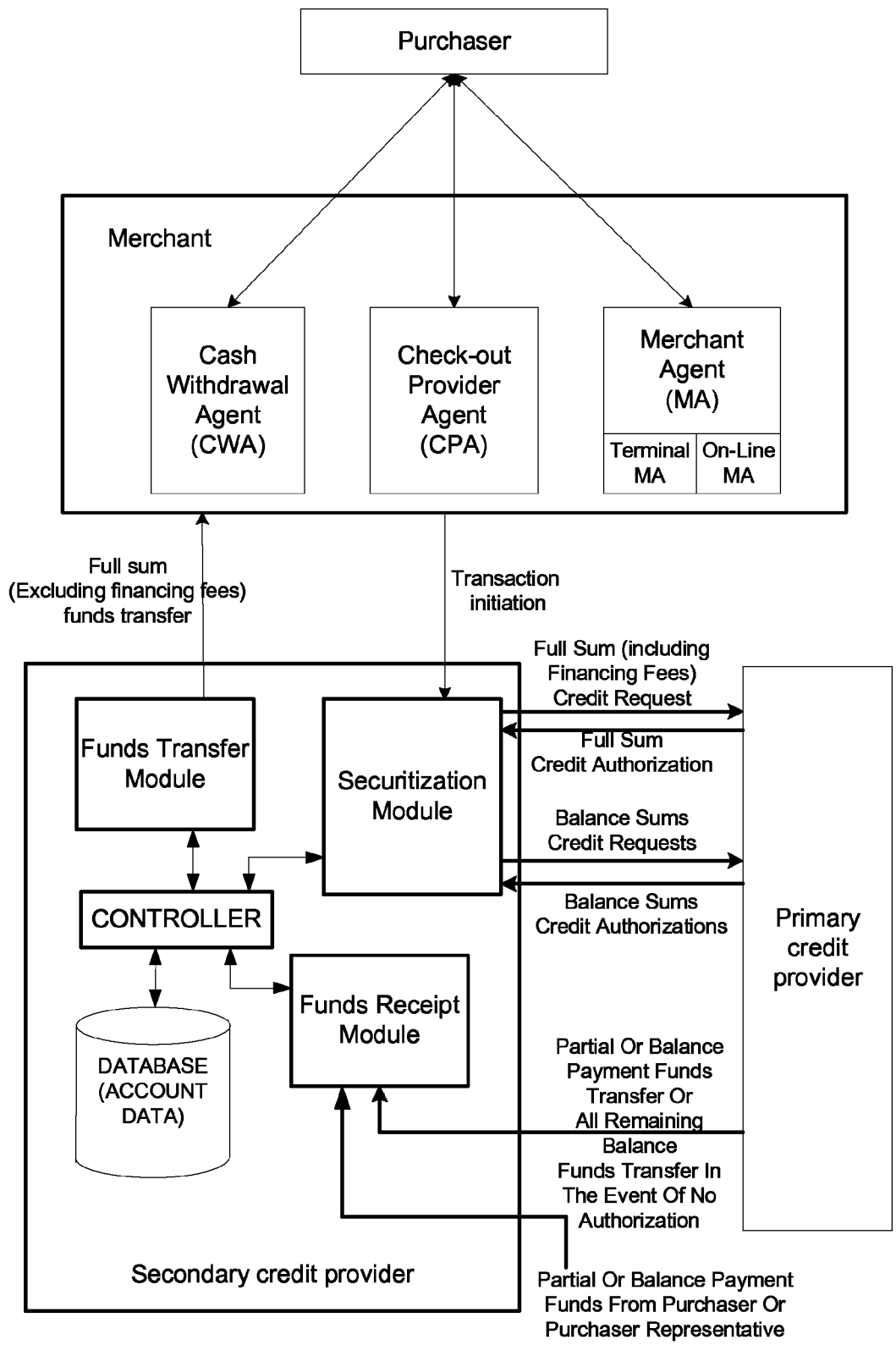
FIG. 2 is a table describing the modules of an exemplary system for facilitating transactions, in accordance with some embodiments of the present invention.

In FIG. 2 there is shown, in accordance with some embodiments of the present invention, a table describing the modules of an exemplary system for facilitating transactions. The purchaser initiates a transaction through a Cash Withdrawal Agent (CWA), a Check-out Provider Agent (CPA) or a Merchant Agent (MA) such as an On-Line Merchant Agent or a Terminal Merchant Agent. The system's (Secondary Credit Provider's) Securitization Module then performs a full transaction sum credit authorization through the Primary Credit Provider, upon a successful credit authorization (securitization) it finances and transfers the entire transaction amount to the merchant using its funds transfer module. Based on the installment plan agreed to by the purchaser, the secondary credit provider intermittently (e.g. before each installment is due) requests balance sums credit authorizations. Each time a balance sum credit request is authorized the secondary credit provider re-securitizes the remaining balance excluding the current installment, requests the primary credit provider to transfer to it the sum of the current installment and receives it using its funds receipt module. If a balance sum credit request is not authorized the secondary credit provider requests the primary credit provider to transfer to it the entire balance of the transaction, based on the last prior authorization made by the primary credit provider.

In FIG. 3 there is shown, in accordance with some embodiments of the present invention, an image of an exemplary transaction payment arrangement agreement wherein based on the sub total of the transaction, the number of installments and the calculated interest; the amount of the first installment and the balance sum (after payment of the first installment are calculated and presented.

According to some embodiments of the present invention, as part of a cost spread to installments, a Consumer of goods and/or services and/or monetary means (e.g. cash), may request that a secondary credit provider pay the merchant the cost of the purchased goods and/or services. Said secondary credit provider may be any third party willing to finance said transaction (e.g. any financial institution, the merchant himself, any other individual(s) or entities).

According to some embodiments of the present invention, the secondary credit provider may provide the Consumer with repayment terms (e.g. monthly payments/installments) for the principle amount to be paid by the secondary provider and/or for financing fees (e.g. interest or any other kind of fees). The secondary credit provider may securitize the amounts to be paid to the merchant with a credit line provided to the Consumer by a primary credit provider (e.g. credit card issuer). Concurrent with or prior to payment to merchant, the financing party (e.g. secondary credit provider) may request from the primary credit provider credit authorization for the remaining amounts due, including financing fees (e.g. interest, commission, any other supplementary fee).

According to some embodiments of the present invention, the secondary credit provider may request from the primary credit provider partial payment of the authorized credit based on the agreed upon repayment terms between the secondary credit provider and the Consumer. Since each credit authorization expires either within a predefined period of time or based on some action, the secondary credit provider may re-securitize any remaining balance owed to it by the Consumer by intermittently re-requesting credit authorization for the remaining balance.

According to some embodiments of the present invention, the above re-securitization and money transfer cycle may be re-executed until all due payments are transferred to the secondary credit provider. In the event of a re-securitization failure, said secondary credit provider may request the primary credit provider to transfer the full remaining balance from Consumer to it, based on the last prior credit securitization performed.

According to further embodiments of the present invention, by re-securitization of some or all of the remaining balance owed to the secondary credit provider, just prior to, in parallel or just after purchaser's/cash-withdrawer's payment of each installment (i.e. prior/in parallel/after the expiration [time or action initiated] of each former credit securitization), risk of non-collectable sums may be reduced or minimized.

[Role/Identity of Primary and Secondary Credit Providers]

According to some embodiments, the merchant may be a retailer of goods, real estate, cash and/or a provider of services such as: (1) financial services, (2) banking services, (3) leasing services, (4) communication services, (5) medical services, (6) travel services, (7) currency exchange service, or any other goods or services. The merchant may provide Customer with goods or services: (1) at a manned point of sale (e.g. cash register), (2) through an automated apparatus (e.g. product dispenser, automatic teller machine, etc.), (3) through an online e-commerce site or through an online checkout application, and/or (4) via a mobile commerce system, or through any way known now or to be devised in the future.

According to some embodiments, a retailer may also provide financial services, for example loaning or otherwise providing currency to a Customer. According to some embodiments, the merchant or goods and/or services may act as the secondary credit provider. For example a retailer, based on securitization provided by one or more primary credit providers, may provide a Customer with financing for: (1) an instant cash loan; (2) a purchase, rental or leasing of a product; and/or (3) a service. According to some embodiments secondary credit provider could be any bank(s), and/or accredit union, and/or any financial institution(s), and/or any other entities, and/or individual(s).

According to some embodiments, the primary credit provider may be a credit card issuer, a financial institution, a credit union, and/or any other entity extending and/or committing credit and/or payment services to and on behalf of the Customer.

[Options for Establishing Secondary Creditor (Transaction Payer) Availability/Facilities]

According to some embodiments a Customer may establish facilities or availability for transaction payment by the secondary creditor (secondary credit provider) either during or in advance of a given transaction. As part of establishing a Payer arrangement with a secondary creditor or the organizer of the secondary credit, the Customer may provide personal and financial information including: (1) name, (2) address, (3) an identifications number (e.g. Social Security Number), and (4) one or more identifiers of primary creditor accounts (e.g. credit card accounts) against which the secondary creditor may secure repayment of payments made or other consideration extended by secondary creditor on behalf of the Customer. According to further embodiments, the Customer may be provided a set of primary account indicators for as a bank of primary credit lines which may be used to securitize transaction related costs, and the Customer may designate: (1) a preference for primary account order or priority when securitizing a transaction amount; (2) a preferred ratio for splitting securitization of a transaction amount across multiple primary creditor accounts; and (3) a any other rules or parameters which may be used by a securitization module according to embodiments of the present invention when authorizing a transaction on behalf of the Customer. According to further embodiments, a Customer may be provide an identifier and use a primary creditor account of one or more other persons and/or entity(ies), for example a company, a family member and/or a friend, such person(s) and/or entities, who have consented to having their credit facilities/accounts being utilized or leveraged by the Customer.

A computer system according to embodiments may include a Customer interface, optionally a web interface, through which a Customer may establish and/or adjust one or more secondary creditor accounts. Establishing and adjusting may include providing or changing information and parameters as described above, and designating or re-designating: (1) a preference for primary account order or priority when securitizing a transaction amount; (2) a preferred ratio for splitting securitization of a transaction amount across multiple primary creditor accounts; and (3) any other rules or parameters which may be used by a securitization module according to embodiments of the present invention when authorizing a transaction on behalf of the Customer.

Establishment of a secondary creditor account according to embodiments may include the issuance of a transaction facilitating token such as a: (1) credit card of the secondary credit provider, (2) a digital token or the like to be used for authentication in online transactions, (3) a mobile application component for use with mobile payments, and/or (4) any other payment facilitating tokens or instruments known today or to be devised in the future. The token may be specific to a given Customer account and may be used by the Customer when initiating a transaction according to embodiments of the present invention. The token may include one or a set of Customer identifiers usable by a computerized transaction authorization system according to embodiments to initiate steps required to authenticate and authorize a transaction in which the Customer wishes to engage.

In FIG. 4 there is shown, in accordance with some embodiments of the present invention, a table describing the modules of an exemplary system for facilitating transactions comprising a consumer interface module, a merchant interface module and a primary credit provider(s) interface module. The consumer uses the consumer interface module to access and edit/update the secondary credit provider's consumer/customer records/profile, adding or changing personal details, his list of primary credit providers, their terms of usage and or any other attributes relating to his own details and/or his primary credit provider(s). The merchant interface module is used by the merchant for sending requests for secondary credit provider service, for a consumer transaction funding, and receiving replies to these requests. The primary credit providers interface module (securitization module) sends securitization requests, that are based on the transaction details supplied by the merchant and the consumer's primary credit providers profile, to one or more primary credit provider(s) and receives in return replies from the one or more primary credit providers approached (e.g. Authorized/Not Authorized/Partially Authorized).

According to some embodiments of the present invention, a charge-back procedure may be initiated as a result of a product or service not provided, rightly returned or for any other reason which may justify refund of some or all of the purchase or financing fees, to the purchaser and/or to other parties. The financing party (e.g. Secondary credit provider) may retrieve the 'charged back' transaction details and may accordingly debit the merchant on part of or on the entire purchase amount. Out of the debited amount, it may order the primary credit provider to refund, or otherwise refund, some of or the entire purchaser's already paid amounts and some of or the entire amounts, not yet paid to it by the purchaser.

According to some embodiments of the present invention, said method may be used to externally orchestrate, or may allow or enable for the collaboration of one or more independent, external or internal entities—of any Consumer, credit provider, merchant, acquirer, issuer or other, in order to facilitate the Installments method described hereinbefore. Furthermore an external or modular financing of these Installments transactions (e.g. by an external/$3^{rd}$ party/secondary credit provider) may be utilized and may enable for one or more secondary credit financing sources, or for the withdrawal of cash from different merchants, which may or may not be specifically customized for this type of service and may or may not be the withdrawal transaction's financing entity.

According to some embodiments of the present application, there is provided a transaction system adapted to facilitate credit transactions between a merchant, and a Consumer of goods and/or services and/or monetary means (e.g. cash), which may be initiated at or through any point of access (e.g. online, point of sale, automatic teller machine).

As part of the transaction system, or functionally associated with the transaction system, there may be provided a merchant agent, checkout provider agent or cash withdrawal agent module. The merchant agent, checkout provider agent or cash withdrawal agent module, which may be accessed through any point of access (e.g. online, point of sale, automatic teller machine/ATM), may be adapted to offer the Consumer with repayment terms for the principle amount to be paid to the merchant by the financing party (e.g. secondary credit provider) and for financing fees (e.g. interest or any other fees), by which costs may be spread over a period of time (e.g. monthly payments, installments), and initiate such a transaction upon approval by said Consumer.

As part of the transaction system, or functionally associated with the transaction system, there may be provided a securitization module. The securitization module may be adapted to securitize the amounts to be paid to the merchant plus financing fees by requesting credit authorization for the full amount form a primary credit provider (e.g. a credit card issuer or any other credit provider), possibly by using a credit line provided to the Consumer. Said securitization module may be further adapted to request from the primary credit provider credit authorization for the remaining amounts due, including financing fees concurrent with or prior to payment to merchant.

[Transaction Payment Authorization Details—Type of Securitization]

According to some embodiments of the present invention, as part of a transaction cost/amount being spread to installments, a Consumer of goods and/or services and/or monetary means (e.g. cash), may utilize a payment mechanism or token, such as a payment card or online payment application, provided by a secondary credit provider. Using the secondary credit provider's payment mechanism may cause the secondary credit provider to: (1) authenticate details of the transaction; (2) check availability of one or more primary credit-lines sufficient to cover the transaction amount, and (3) subject to (1) and (2), to pay the merchant the some or all of the cost of the purchased goods and/or services. The secondary credit provider may be any third party willing to finance said transaction (e.g. pay the merchant).

According to some embodiments of the present invention, the transaction amount, provided by the secondary credit provider, including financing fees, may be securitized, for example against one or more credit lines provided to the Consumer by one or more primary credit providers. Based on said securitization, secondary credit providers may pay the merchant the transaction amount, usually excluding financing fees. According to some embodiments, an amount securitized against any one of the one or more primary credit lines may be a fixed amount, a fixed percentage or a dynamically calculated amount. According to embodiments where an outstanding balance is securitized against two or more credit lines, an amount selected for each one of the two or more primary lines may be dynamically selected so as to mitigate a risk of any of the primary credit providers declining to securitize the portion selected for their securitization.

As part of the transaction system, or functionally associated with the transaction system, there may be provided a money transfer module. The money transfer module may be adapted to order, upon said primary credit provider authorization, the transferring of the full purchase/cash-withdrawal amount excluding financing fees from a secondary credit provider to the merchant According to some embodiments of the present invention, said securitization module may be further adapted to re-securitize any remaining balance owed to the secondary credit provider by the Consumer by intermittently re-requesting credit authorization for the remaining balance. Said money transfer module may be further adapted to request, upon re-securitization of the remaining balance, the primary credit provider to transfer the amount of the current payment according to pre-agreed repayment terms (e.g. monthly payments) from Consumer to the secondary credit provider.

According to some embodiments of the present invention, the above re-securitization and money transfer cycle may be re-executed until all due payments are transferred to the secondary credit provider. In the event of a re-securitization failure, said money transfer module may be further adapted to request the primary credit provider to transfer the full remaining balance from Consumer to the financing party (e.g. secondary credit provider), based on the last prior credit securitization performed.

According to further embodiments of the present invention, said securitization module may be adapted to re-securitize some or all of the remaining balance owed to the secondary credit provider, just prior to, in parallel or just after purchaser's/cash-withdrawer's payment of each installment (i.e. prior/in parallel/after the expiration [time or action initiated] of each former credit securitization) thus reducing or minimizing the risk of non-collectable sums.

[Repayment and Re-Securitization Methods/Options]

According to some embodiments of the present invention, partial payment of the transaction's cost may be received either from the primary credit provider or directly from a purchaser of the goods or service. According to some embodiments of the present invention, upon a re-securitizing failure, secondary credit provider may receive full balance payment from the primary credit provider.

According to some embodiments of the present invention, a partial payment received by the secondary credit provider may be one of a set of equal or one of a set of non-equal partial payments. Sizes and timings of received payments may be determined according to a predefined payment schedule, further, the partial payment may be substantially equal to the funded amount plus financing fees, divided by the number of payments to be made.

According to some embodiments of the present invention a repeating cycle of re-securitizations may be initiated, wherein each cycle may comprise: a re-securitization of the remaining balance; and a request for the current payment, based on to the terms pre-agreed upon by Consumer, to be transferred to the secondary credit provider (e.g. through a credit line provided to the Consumer by a primary credit provider).

According to some embodiments of the present invention, said repeating cycle may terminate after all due payments were transferred to said secondary credit provider. In the event of a re-securitization failure, said secondary credit provider may request the primary credit provider to transfer the full remaining balance from Consumer to it, based on the last prior credit securitization performed.

According to some embodiments of the present invention, securitizing and/or re-securitizing of the cost(s) of the transaction over a data network may consist of issuing a credit request and receiving credit authorization. According to some embodiments of the present invention, intermittent receipt of partial payment may further include receipt of transaction related financing costs and/or receipt of commission costs.

According to some embodiments, it is possible to use different cycles for requesting authorization and request for payment from one or more primary credit providers. The normal cycle may be a monthly cycle, however, it may be different if needed for any reason. A cycle for request for authorization could be, for example, 25 (twenty five) days.

Cycle for request for payment will be, for example, one month. More specifically:

1. The purchase occurred on March 1 and authorization was requested and received on March 1.

2. On March 25 Requested and received authorization. Payment was requested and received on April 1. In case if request for authorization will be rejected we have additional 5 days to take remedial action, for example, repeatedly request authorization, and/or request another credit card from consumer. In case of black-out we probably will have sufficient time, because electrical system usually became totally operational in two-three days.

3. On April 19 requested and received authorization. Payment was requested and received on May 1.

4. On May 14 requested and received authorization. Payment was requested and received on June 1.

5. On June 8 requested and received authorization. Payment was requested and received on July 1.

6. On July 3 requested and received authorization. Payment was requested and received on August 1.

7. On July 28 requested and received authorization. (NOTE: on this step there is no request for authorization).

8. On August 22 requested and received authorization. Payment was received on September 1.

9. On September 16 requested and received authorization. Payment was requested and received on October 1.

10. On October 11 requested and received authorization. Payment was requested and received on November 1.

11. On November 6 requested and received authorization. Payment was requested and received on December 1.

12. On December 20 requested and received authorization. Payment was requested and received on January 1.

13. On January 4 requested and received authorization. Payment was requested and received on February 1.

14. On January 29 requested and received authorization. (NOTE: on this step there is no request for authorization).

15. On February 22 requested and received authorization. Payment was requested and received on March 1.

16. On March 18 requested and received authorization. Payment was requested and received on April 1.

17. On April 13 requested and received authorization. Payment was requested and received on May 1.

Accordingly, in such example, double authorization may only occurred in last 5 (five) days of 30 days authorization. It is very probable that in 25 days authorization will be taken out of record of the primary credit provider.

In the above example there is always a 5 day difference/overlap between the current authorization being made and the expiration of the one presently in effect. Such 5 days time (in this example) give assurance that: (i) in case of a denial of authorization there is sufficient time to take remedial actions such as: re-attempting securitization, contacting the customer for another source of securitization (i.e. another primary credit line such as another card of the customer, or a card of any other individual(s) and/or entity, with prior or current approval from such individual(s)/entity(ies)); (ii) in most cases of blackout/brownout, or any other catastrophic failure in the invention's system or external systems functionally associated with it (for example communication system), 5 days are sufficient time for power-up; (iii) in case of a massive hacker/malware/cyber attack, or an internal software failure, which may be related to an internal or an external event (e.g. the bug 2K in the year 2000); (iv) any other internal and/or external event(s).

According to further embodiments, the system may allow for the adjustment of the cycle of payment and authorization in order to meet head to head with possible threats. According to yet further embodiments, such payment and authorization cycles may be dynamically adjusted in the case of perceived different or additional threats; in response to a request made by one of the parties (consumer/merchant/secondary credit provider); and/or in response to a change in the regulatory environment by governmental or semi governmental bodies, by major primary credit systems, or any other entity.

According to some embodiments of the present invention the second credit provider may be adapted to handle a chargeback procedure initiated as a result of a product or service not provided, rightly returned or for any other reason which may justify refund of some or all of the purchase or financing fees, to the purchaser and/or to other parties. Secondary credit provider may be further adapted to retrieve the 'charged back' transaction details and may accordingly debit the merchant on part of or on the entire purchase amount. Out of the debited amount, it may order the primary credit provider to refund, or may otherwise refund, some of or the entire purchaser's already paid amounts and some of or the entire amounts, not yet paid to it by the purchaser.

According to some embodiments of the present invention, said system may be adapted to externally orchestrate, or may allow or enable, for the collaboration of one or more independent, external or internal entities—of any Consumer, credit provider, merchant, credit card acquirer, credit card issuer, organizer of transaction with installments payments, or other, in order to facilitate the Installments method described hereinbefore. Furthermore, said system may be adapted to allow for the utilization of external or modular financing of these Installments transactions (e.g. by an external/$3^{rd}$ party/secondary credit provider) and thus may enable for one or more secondary credit financing sources, and/or for the withdrawal of cash from different merchants, which may or may not be specifically customized for this type of service and may or may not be the withdrawal transaction's financing entity.

According to some embodiments of the present invention, a payment plan may be amended and custom-made to Consumer, e.g. postponing first payment, varying the payment schedule according to a pre-determined plan agreed with Consumer and more. According to some embodiments, a payment plan may be amended at any time after the conclusion of the agreement with the consumer in order to accommodate current needs of the consumer. According to some embodiments, such an amendment of the payment plan may be a predetermined function, or may take place as a result of a predetermined function of certain outside factors (e.g. change in the prime rate for loans).

According to further embodiments, the consumer may prepay the entire outstanding balance or prepay part of the outstanding balance—in which case his payment plan may be amended in one, or more, of several ways, including: reducing the amounts of at least some of the installments, reducing the number of installments, and so on.

According to some embodiments of the present invention, a payment may be accepted, and/or securitization may be done, from a different source if current payment is declined, for example from Consumer's additional credit card or from another person(s) or entities following Consumer's request.

According to some embodiments of the present invention, a transaction may be funded through the merchant.

According to some embodiments of the present invention, a transaction funding may be divided between several collectors (for example, the merchant, the funding body, the clearing body, or any other body).

According to some embodiments of the present invention, a down-payment for leasing or mortgages may be funded by dividing the down-payment cost to installments (fully or partially) when purchasing or leasing, for example, a car, a boat, a house and more through the system. Such funding of down-payment may be provided by any primary credit provider(s).

According to some embodiments of the present invention, the system may be used for giving out loans in installments which may be collected directly through the credit or debit card used by the consumer for the monthly payments, directly to the Consumer's bank account or in the other way. Such credit may be securitized by a primary creditor (e.g. by issuer of credit card, a credit union or a bank, a non-bank credit card issuer).

According to some embodiments of the present invention, a Consumer may open an account in the system where they may update the details of additional credit cards in order for the system to divide the ongoing authorizations/re-securitizations as well as the actual collection, between the different cards according to the Consumer's instructions or a formula within the system, to divide the risk and increase the chances of approving the transactions, or according to the credit card type (Platinum before Gold etc.).

According to some embodiments of the present invention, opening an account may enable the system to automatically request re-securitization or approval for collection from another card listed in the Consumer's account if one of the re-securitization or collection procedures from the first card has been declined in the duration of the Consumer's funding period.

According to some embodiments of the present invention, the system may know how to execute the transaction through a specific card or to divide it between a number of cards which the Consumer may have registered in his account in order to maximize the consumer benefits existing in the different cards according to the Consumer's instructions or according to the system's decision in a way that may maximize the benefits to the Consumer (for example, collecting air miles, reimbursement of funds (e.g. cash back etc.).

According to some embodiments of the present invention, a Consumer may re-finance/re-securitize all of the existing transactions through the purchaser's account on the system, combining or dividing some or all the remaining balance in the different transactions.

According to some embodiments of the present invention, an automatic system may be created to divide funding of an external entity between several financing bodies (simulate funding syndicate) and distributing the funding between the bodies according to a pre-determined module to be agreed upon with the financing bodies as well as attaching the authorization of the Primary Credit Provider to the financing bodies relative to the risk and the extent of their commitments in the transaction.

According to some embodiments of the present invention, the system may divide the securitization requests according to an algorithm which may enable a higher chance of approval in the securitization process (for example, by dividing one securitization request into two: one for the due installment and one for the remaining amount).

In FIGS. 5-12 there are shown, in accordance with some embodiments of the present invention, various exemplary primary credit provider securitization scenarios of an exemplary system for facilitating transactions.

In FIG. 5 there is shown, in accordance with some embodiments of the present invention, an exemplary two stage scenario wherein the primary credit provider authorizes both: the initial securitization of the full transaction amount, and the following remaining transaction balance sum(s).

In FIG. 6 there is shown, in accordance with some embodiments of the present invention, an exemplary two stage scenario wherein the first primary credit provider does not authorize both: the initial securitization of the full transaction amount, and the following remaining transaction balance sum(s). Upon each failure to authorize, the secondary credit provider approaches a second primary credit provider (e.g. listed in the consumer's second credit provider's consumer records/profile) which authorizes the securitizations.

In FIG. 7 there is shown, in accordance with some embodiments of the present invention, an exemplary scenario wherein the first primary credit provider authorizes securitization of only 50% of the transaction amount. Upon failure to authorize the entire transaction amount, the secondary credit provider approaches a second primary credit provider (e.g. listed in the consumer's second credit provider's consumer records/profile) which authorizes the securitization of the reminder of the transaction amount.

In FIG. 8 there is shown, in accordance with some embodiments of the present invention, an exemplary scenario wherein the secondary credit provider inquires in regard to a securitization of a transaction amount by the first primary credit provider and the first primary credit provider provides securitization details (e.g. a 5% commission). the secondary credit provider then inquires in regard to a securitization of a transaction amount by the second primary credit provider and the second primary credit provider provides securitization details (e.g. a 2% commission). Due to the preferred terms offered by the second primary credit provider the second credit provider proceeds to securitize the transaction with it rather than with the first primary credit provider.

In FIG. 9 there is shown, in accordance with some embodiments of the present invention, an exemplary scenario wherein the merchant is the primary credit provider. The second credit provider requests and receives securitization authorization from the merchant, based on which authorization it funds the transaction.

In FIG. 10 there is shown, in accordance with some embodiments of the present invention, an exemplary scenario wherein the merchant is the secondary credit provider inquires with the consumer in regard to which of his primary credit providers (e.g. listed in the consumer's second credit provider's consumer records/profile) he wishes to use for securitization. Upon receipt of the consumer's selection of his preferable primary credit provider (e.g. The second primary credit provider) the secondary credit provider proceeds to securitize with the selected primary credit provider.

In FIG. 11 there is shown, in accordance with some embodiments of the present invention, an exemplary scenario wherein the consumer updates his secondary credit provider's records/profile adding a primary credit provider (the Fourth) and removing another (the Second).

In FIG. 12 there is shown, in accordance with some embodiments of the present invention, an exemplary scenario wherein the consumer updates his secondary credit provider's records/profile requesting all transactions acceding $100 to be securitized by a specific primary credit provider (the Fourth). Accordingly, a subsequent transaction of an amount not acceding $100 is referred to other primary credit providers (First, Second or Third; First in this case), whereas a subsequent transaction of an amount acceding $100 is referred to the specific primary credit providers designated by the consumer (the Fourth in this case).

According to some embodiments, the system, described herein, is organized and structured as a "cloud" or partially as a "cloud".

Further, according to some embodiments the system, described herein, is organized and structured to perform other tasks beyond the tasks for the method, described in this invention.

According to some embodiments the system, described herein, is organized and structured to accommodate affiliation program(s) for the individuals and/or entities, who are able to organize relation of owner and/or operator of such system, on the one hand, and merchant(s) and/or consumer(s), and/or acquirers(s), and/or secondary credit provider(s), and/or any other party, on the other hand.

Further, such system is designed to provide individualized relevant information (e.g. report(s)), on a need to know basis, to each member of the affiliation program. Also such system may have modules for the analysis of provided information. Such provided information may be given upon request, upon intervals of time. Further a member of the affiliation program may be provided with automatic signal (e.g. SMS, e-mail) that there are predetermined changes of relevant variables, factors numbers and so on, and/or predetermined occurrence of certain events.

The affiliation may have members of different levels. It means that members of the affiliation program may have agreements with the owner and/or operator of such system (level 1). The member at level 1 may have agreements with other individual(s) and/or entities (level 2). The member at level 2 may have agreements with different individual(s) and/or entities (level 3).

The number of levels which could be accommodated by such a system is virtually unlimited.

The compensation provided to any particular member of the affiliation program is individualized and may vary for the different circumstances, events, cases, factors, and could be calculated using various algorithms.

In some embodiments the system described herein, is organized to accommodate and organize promotional lotteries, bonuses, awards, prizes based on various algorithms and factors. Such lotteries, bonuses, awards, prizes could be organized separately and/or jointly for the benefits of the groups belonging to the following classes, and/or entire classes as follows:

Consumers
Merchants and/or their employees;
Member of affiliation programs, and/or their employees, and/or connection to their individuals and entities;
Primary creditors and/or their employees;
Secondary creditors and/or their employees;
Other classes of individuals and/or entities According to some embodiments the system, described herein, is capable to accommodate and organize various jackpots, including but not limited to the progressive jackpots, random events jackpots, such jackpots may be based on various algorithms and factors. Such jackpots could be organized separately and/or jointly, and/or partially jointly for the benefit of the groups belonging to the following classes, and/or entire classes as follows:

Consumers;
Merchants and/or their employees;
Members of affiliation programs, and/or their employees, and/or connected to them individuals and entities;
Primary credit providers and/or their employees;
Secondary credit provider and/or their employees;
Other classes of individuals and/or entities While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for facilitating credit based transactions associated with a customer purchase or lease of a good, a service, or real estate having a transaction cost, or providing a loan, wherein said method comprising:
receiving over a data network data indicating the transaction cost;
dynamically securitizing over a data network the transaction cost against a credit line provided by one or more primary credit providers;
upon interactively setting an intermittent partial payments schedule for repayment of the transaction cost, funding at least part of the transaction;
intermittently receiving a partial payment for repayment of an outstanding balance of the transaction cost; and
intermittently re-securitizing a remaining outstanding balance, with such schedule that remaining outstanding balance will be always securitized.

2. The method according to claim 1, wherein the transaction is of a type selected from the group consisting of: a purchase of a good or real-estate; a lease of a good or real-estate; a purchase or lease of a service; a cash withdrawal; a lease or rent of a premises; a payment of damages to a leased or rented property; a payment of fees, payment of fines or penalties related to the termination of a lease or rent; a set of periodical payments; payment of fees, fines or penalties related to the funded and/or underlying transaction; payment of taxes or insurance costs; and/or payment of communal fees.

3. The method according to claim 2, wherein at least one of the one or more primary credit providers is selected from the group consisting of: (1) a bank, (2) a credit card company, (3) a credit union, (4) a merchant, (5) a manufacturer.

4. The method according to claim 3, wherein securitizing over a data network the transaction cost against a credit line provided by one or more primary credit providers includes selecting one or more primary credit providers from a pool of optional credit providers identified by the customer.

5. The method according to claim 1, wherein the intermittent partial payment is received from a primary credit provider.

6. The method according to claim 1, wherein the intermittent partial payment is received from the customer of the good or service.

7. The method according to claim 1, further comprising, upon a re-securitization failure or upon a failure to receive a partial payment, demanding a full outstanding balance payment from the primary credit provider usually based on prior authorization.

8. The method according to claim 1, further comprising, upon a re-securitization failure with a first primary credit provider, attempting a re-securitization with a second primary credit provider.

9. The method according to claim 1, wherein the intermittent partial payment is substantially equal to a sum of the funded amount with financing fees and divided by a number of scheduled partial payments.

10. The method according to claim 1, wherein securitizing the cost of the transaction over a data network comprises issuing a credit request and receiving a credit authorization.

11. The method according to claim 1, wherein intermittently re-securitizing an outstanding balance comprises issuing a credit request and receiving a credit authorization.

12. The method according to claim 1, wherein the intermittent partial payments schedule for repayment of the transaction cost is selected by the customer either during or prior to the transaction.

13. The method according to claim 12, wherein the intermittent partial payments schedule for repayment of the transaction cost is altered after the transaction upon request of one of the parties.

14. The method according to claim 1, wherein a transaction is funded through the merchant.

15. The method according to claim 1, wherein a transaction funding is divided between several sources of funding.

16. The method according to claim 1, wherein a down-payment, for purchases which are at least partially funded by the loan, is funded by dividing the down-payment cost to installments.

17. A transaction system for facilitating credit based transactions associated with a customer purchase or lease of a good, a service or real estate having a transaction cost, said system comprising:
one or more transaction servers including processing circuits, communication circuits and collective control logic adapted to: (1) receive over a data network data indicating the transaction cost; (2) dynamically securitize over a data network the transaction cost against a credit line provided by one or more primary credit providers; (3) interactively set an intermittent partial payments schedule for repayment of the transaction cost, trigger funding at least part of the transaction; (4) intermittently receive a partial payment for repayment of an outstanding balance of the transaction cost; and (5) intermittently re-securitize a remaining outstanding balance, with such schedule that remaining outstanding balance will be always securitized.

18. The system according to claim 17, wherein said logic includes a securitization module adapted to securitize the cost of the transaction.

19. The system according to claim 18, wherein said securitization module is further adapted to receive data relating to the number and or sum of said partial payments.

20. The system according to claim 18, wherein said securitization module is further adapted to receive the data indicating the cost of a good or service from a merchant agent selected from a group consisting of Terminal Merchant Agent, On-Line Merchant Agent, Check-out Provider Agent and Cash Withdrawal Agent.

21. The system according to claim 18, wherein said securitization module is further adapted to initiate a credit request and to receive a credit authorization as part of securitizing the cost of the transaction.

22. The system according to claim 18, wherein said logic further includes a funds transfer module adapted to perform funding of the transaction upon securitization.

23. The system according to claim 18, wherein said logic further includes a fund receipt module adapted to receive partial or full payment. Further the system according to claim 18, wherein said logic further includes module which upon securitization may receive full or partial funding of transaction from one, or from several secondary credit providers, and/or merchant; said logic further include module which provided payment of funds received from secondary credit provider to the merchant; said logic further include module which provided payment of funds received from consumer to the merchant and or one or more secondary credit providers.

24. The system according to claim 23, wherein said funds receipt module is further adapted to receive full balance payment from the primary credit provider upon a re-securitization failure.

25. The system according to claim 18, wherein said securitization module is further adapted to intermittently re-securitize an outstanding balance.

26. The system according to claim 17, wherein said system is used for giving out loans in installments or for giving loans with re-payment in installments.

27. The system according to claim 17, wherein said control logic is adapted to interact with a consumer and receive details of additional credit providers. Further the system according to claim 17, wherein such control logic is adapted to interact with consumer, merchant, secondary credit provider and any other authorized third party with module provide automatic warning and alarm messages to the interested party via E-mail, SMS and so on; also with modules to provide record, reports, statements, letters, E-mails automatically to interested parties; also with modules to provide on-line communication.

28. The system according to claim 27, wherein said control logic is adapted to securitize the transaction through a specific credit line or to divide the securitization across a number of credit lines.

29. The system according to claim 27, wherein said control logic is adapted to request intermittent payments from a specific credit line or to divide the securitization across a number of credit lines based on an algorithm for maximizing benefits provides by different credit lines.

30. The system according to claim 17, wherein said control logic is adapted to provide for the option to re-finance/re-securitize a set of existing transactions by combining or dividing some or all the remaining balance in the set of transactions.

31. The system according to claim 27, wherein said control logic is adapted to automatically request re-securitization or approval for collection from another card line listed in the Consumer's account if one of the re-securitization or collection procedures from the first card has been declined.

32. The system according to claim 17, wherein said control logic is adapted to divide funding between several financing bodies and distributing the funding between the bodies according to a pre-determined method as well as to attach the authorization of the Primary Credit Provider to the financing bodies relative to the risk and the extent of their commitments in the transaction.

33. The system according to claim 17, wherein said system is adapted to divide the securitization requests according to an algorithm which may enable a higher chance of approval in the securitization process.

34. The system according to the claim 33, wherein said system is adapted to automatically request re-securitization or approval for collection from credit cards listed in the accounts of other individuals according to prior or current permissions of such individuals and of the consumer.

35. The system according to claim 17, wherein control of the owner or operator of the transaction system is selected from group consisting of: the merchant, the secondary credit provider, an independent party, or any combination thereof.

* * * * *